Figure 1:
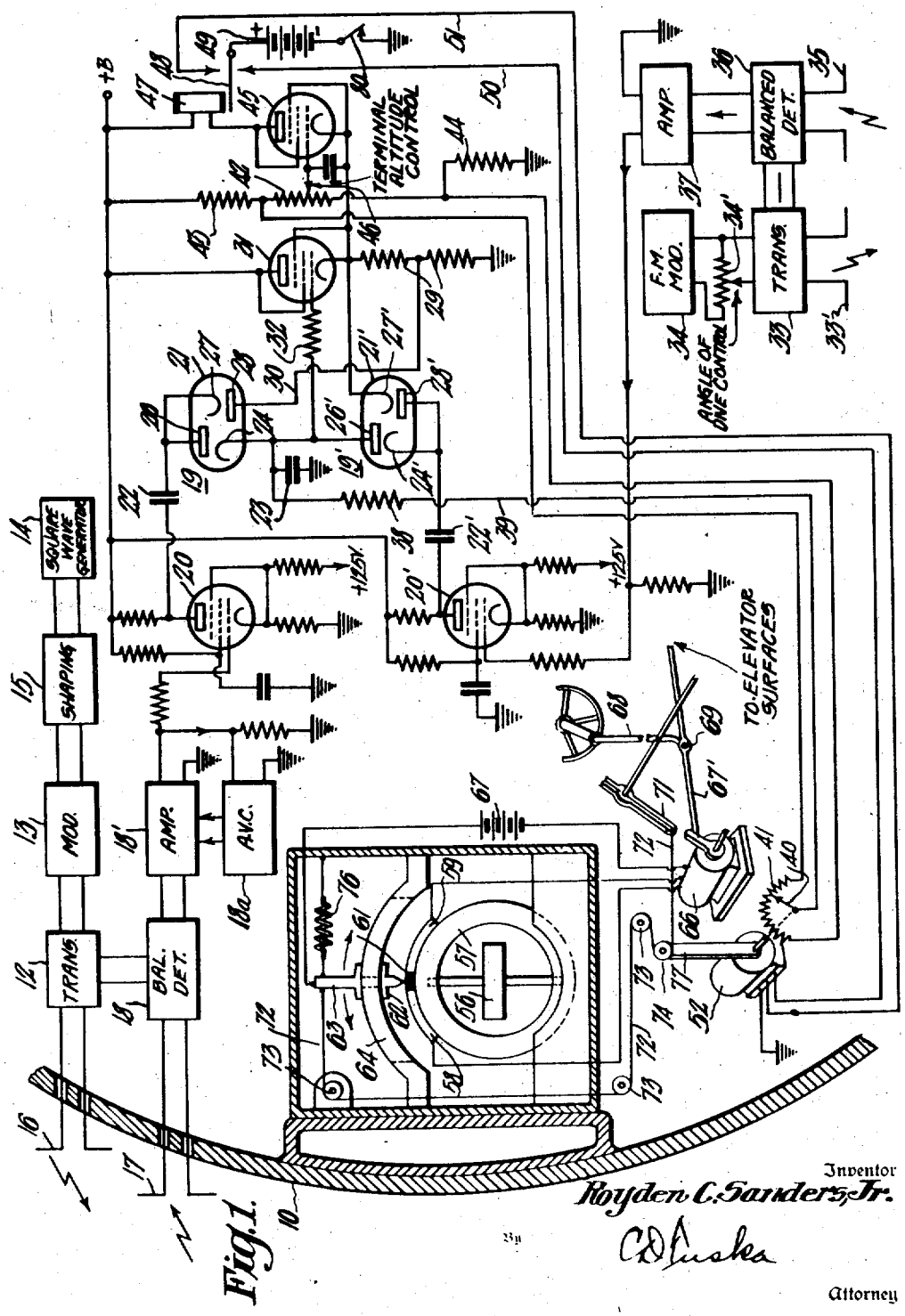

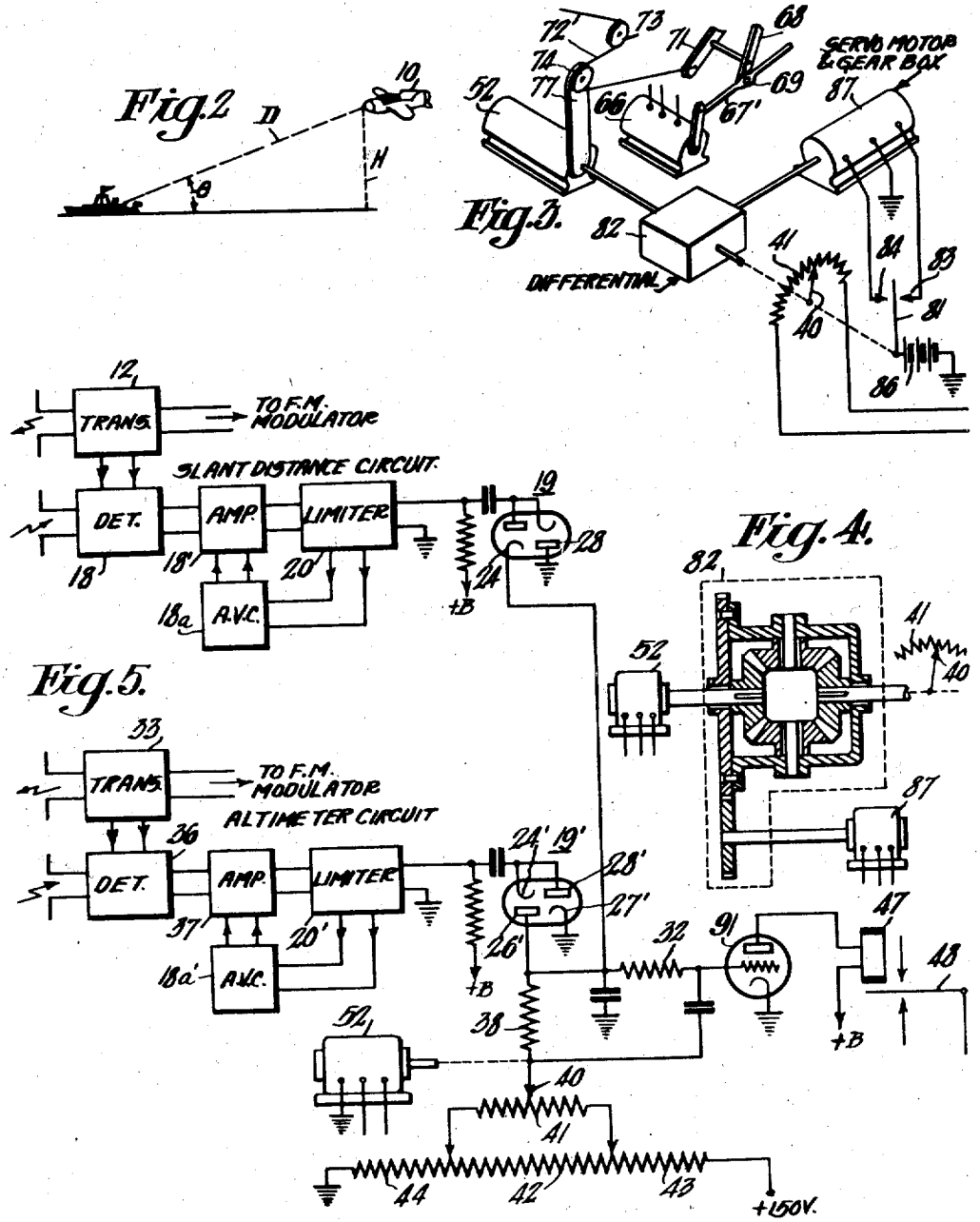

Patented Nov. 16, 1948

2,454,009

UNITED STATES PATENT OFFICE 2,454,009

RADAR CONTROL SYSTEM

Royden C. Sanders, Jr., Hightstown, N. J., assignor to Radio Corporation of America, a corporation of Delaware Application June 30, 1944, Serial No. 542,989

4 Claims. (Cl. 343—7)

My invention relates to the automatic control of an object in flight and particularly to the use of a reflected radio signal for directing a dirigible air-borne device such as an aircraft or aerial torpedo along a predetermined downward path towards an enemy ship or other target.

One object is to provide an improved means for and method of flying a bomb loaded aircraft or an aerial torpedo into a target.

Another object of the invention is to provide an improved method of and means for automatically directing an object in flight along a predetermined downward path towards a signal reflecting object.

Still another object of the invention is to provide an improved method of and means for bombing or torpedoing a target.

According to one embodiment of the invention the aircraft or flying torpedo is made to fly toward a target with a constant angle of approach. This may be accomplished by providing the aircraft with a radio altimeter for determining its altitude and with a radio distance determining system for determining its slant distance to the target and by providing a control circuit for decreasing the altitude of the aircraft in response to a decrease in the slant distance to the target. The control circuit may comprise a reversible motor controlled by frequency counters that are connected in differential relation and to which are applied the outputs of the slant distance determining circuit and the altimeter circuit, respectively. The reversible motor is mechanically coupled through reduction gears to a movable voltage divider tap, the position of which determines the bias on the frequency counters.

The voltage divider tap and the reversible motor comprise a follow-up circuit for the control system which preferably is of the type including a gyrostabilizer. An altimeter and gyrostabilizer system is described and claimed in a copending application Serial No. 484,458, filed April 24, 1943, by Royden C. Sanders, Jr., and John H. Purl, now Patent No. 2,443,748, issued June 22, 1948, and entitled Aircraft control system. As the aircraft approaches a target, the follow-up motor is energized resulting in operation of a pitch motor which operates the elevator controls in such a way as to bring the aircraft to a glide path. Simultaneously, the follow-up circuit changes the bias on the counters, and by a follow-up action eventually brings the differential counter voltage back to its original value, such as zero, and the follow-up motor stops operating until a correction is again required. Preferably an averaging motor operates through a centering switch at a much slower speed than the follow-up motor in such a way as to keep a follow-up potentiometer tap centered, thus keeping the correct bias on the counter circuits whereby the airplane passes over the target at the correct altitude.

The left-right control system for making the aircraft or torpedo fly toward the target may be of the type wherein left-right directive antennas having overlapping radiation patterns are switched for radiating a frequency-modulated radio signal successively therefrom. Such a system is described and claimed in my copending application Serial No. 527,292, filed March 20, 1944, and entitled Comparator circuits for radio locators.

The invention will be better understood from the following description taken in connection with the accompanying drawing in which Figure 1 is a circuit and block diagram of one embodiment of the invention as applied to an aircraft or torpedo; Figure 2 is a diagram that is referred to in explaining the invention; Figure 3 is a diagram showing a follow-up centering system that may be included in the system of Fig. 1; Figure 4 is a view showing the differential unit employed in the system of Fig. 3; and Figure 5 is a circuit and block diagram illustrating another way of connecting the frequency counters for operation in opposing or differential relation. In the several figures, similar parts are indicated by similar reference characters.

Fig. 1 shows the invention applied to an airborne device such as an airplane, a drone, or a glider, which is controllable in flight. The nose of the fuselage of the air-borne device is indicated at 10. The invention will be described as applied to a drone (i. e., an aircraft operated by remote radio control) or flying torpedo that is to be flown with a bomb load into an enemy ship. Thus, as shown in Fig. 2, the aircraft 10 is flown automatically along a path D into the target. The path D may always be at a fixed angle $\theta$ to the earth's surface as indicated in Fig. 2, or the angle $\theta$ may be made to change as the aircraft approaches the target. In any case, according to the present invention, the elevation control of the aircraft is responsive to means for comparing the slant distance from aircraft to target (the distance along path D) and the altitude H of the aircraft whereby the altitude H is reduced as the target is approached, or $H = k_1 D + k_2$ where $k_1$ and $k_2$ are constants.

The apparatus for measuring the slant distance from the aircraft to the target and the apparatus for measuring altitude (the altimeter) are similar as will appear hereinafter. The slant distance measuring apparatus will first be described with reference to Fig. 1. It comprises a frequency-modulated radio transmitter unit that includes a radio transmitter 12, a frequency-modulating unit 13, a square wave generator 14 which supplies a square wave to a wave shaping circuit 15 for producing a triangular wave, for example, whereby a linear frequency modulation of the transmitted radio wave is obtained. The radio wave is radiated forwardly towards the target from a directional antenna 16 which may be of the Yagi type.

The frequency-modulated signal reflected from the target is received by a similar directive antenna 17 and supplied to a detector 18 where it heterodynes with frequency-modulated signal supplied directly from the transmitter 12 to produce a beat signal at audio frequency. Since the beat signal frequency depends upon the radio propagation time to the target, it is a measure of the slant distance. The beat signal is passed through an amplifier 18' to an amplitude limiter 20 and the resulting square wave signal is applied to a frequency counter 19. The amplifier 18' preferably is provided with an automatic volume or gain control circuit 18a.

The counter 19 comprises a pair of oppositely connected diodes in a common envelope 21 to which the square wave from the limiter 20 is applied through ar capacitor 22 of comparatively small capacity. A storage capacitor 23 of comparatively large capacity has a charge supplied to it through the cathode 24 and anode 26 of one diode section upon the occurrence of each positive half cycle of the square wave. Since the capacitor 22 is small enough to reach full charge during the first part of a square wave half cycle, the storage capacitor 23 is charged up a fixed additional amount each time a positive half cycle occurs whereby the voltage thereacross is proportional to the beat frequency, and, therefore, to distance. This is assuming for the moment that the charge on capacitor 23 is not being affected by the altimeter counter 19' circuit described hereinafter. The voltage appearing across the capacitor 23 is applied to the grid of a vacuum tube 31 through a tube protective resistor 32.

The diode section which comprises a cathode 27 and an anode 28 is provided to discharge the capacitor 22 at the end of each positive half cycle. The anode 28 is connected through a lead 30 to an intermediate point on a cathode resistor 29 of the vacuum tube 31 (rather than directly to the cathode of the tube 31) to prevent current flow through the diode 27, 28 due to contact potential and to maintain as nearly as possible the charge delivered each cycle by capacitor 22 a constant value independent of frequency, thus making the output of the counter very nearly linear with respect to frequency.

In order to maintain a predetermined ratio of slant distance to altitude, a radio altimeter similar to the slant distance measuring system is employed. This includes the counter 19', previously mentioned, which is connected so that its diodes and those of the counter 19 supply current to the capacitor 23 in opposing or differential relation.

The altimeter comprises a frequency-modulated transmitter 33 that radiates the signal downwardly from an antenna 33'. The transmitter may be frequency modulated by a modulating oscillator 34 which supplies a triangular wave modulating signal, for example. The band width of the frequency-modulation sweep may be adjusted by means of a variable tap 34'. This adjustment may be employed to control the angle of dive of the aircraft. The reflected signal is received by an antenna 35 and supplied to a detector 36 where it beats with the frequency-modulated signal supplied directly from the transmitter 33 to produce an audio signal having a beat frequency that corresponds to the altitude H (Fig. 2) of the aircraft 10.

The beat frequency signal is supplied through an amplifier 37 and through an amplitude limiter tube 20' to the frequency counter 19'. The counter 19' is of the same general type as the counter 19, but it is a negative counter whereas the counter 19 is a positive counter. The parts in counter 19' corresponding to those in the counter 19 are indicated by the same reference numerals with a prime mark added. The storage capacitor 23 is common to the two diode sections 24, 26 and 24', 26', the first section supplying current to capacitor 23 during the positive half cycles of the slant distance signal to make its upper terminal more positive, and the other section 24', 26' supplying current to capacitor 23 during the negative half cycles of the altitude signal to make its upper terminal less positive. Thus, the potential at said upper terminal is proportional to or a function of the ratio of slant distance to altitude. It will be noted that the cathode 27' is connected to the cathode of the cathode-follower tube 31, instead of to ground, whereby the negative counter 19' also is made substantially linear. Bias for follow-up control is applied to the counters 19 and 19' through a resistor 38 which is connected through a conductor 39 to a follow-up tap 40 on a voltage divider resistor 41. The resistor 41 is connected across a resistor 42 which is one section of a voltage divider comprising resistors 43, 42 and 44.

The cathode follower tube 31 is coupled to a vacuum tube 45 which has its control grid held at a fixed bias having a value determined by the setting of a variable tap 46 on the resistor 42. The plate circuit of the tube 45 includes a relay coil 47 for actuating an armature 48. The relay 47, 48 is operated around the point where the plate current of the tube 31 equals the plate current of the tube 45, on one side of this point the tube 31 going to plate current cut-off and on the other side of this point the tube 45 going to plate current cut-off due to current flow through the cathode resistor 29.

Thus, the relay armature 48 connects a D.-C. source 49 through one of the conductors 50 and 51 to a reversible motor 52, referred to as the pitch motor, with the correct polarity for either forward or reverse operation, depending upon whether the differential output of the counters 19 and 19' is above or below a predetermined value. The D.-C. operating voltage for the limiter and counter tubes is taken from a common source to avoid any unbalance due to changes in the operating voltage amplitude. The pitch motor 52 is mechanically coupled to the follow-up tap 40 through reduction gears (included in the motor unit 50) whereby the counter bias is changed when the motor 52 rotates, the bias change being in the direction to stop the motor rotation.

It has been shown how the motor 52 is caused to rotate in one direction or the other (moving the follow-up tap 40 with it) in response to a departure from the desired ratio of slant distance to altitude caused by the aircraft getting either above or below the slant path D. This rotation of the motor 52 functions primarily to control the elevator surfaces of the aircraft for bringing it back to the slant path D. In the example illustrated, the motor 52 is tied in with an automatic pilot mechanism of known construction that also controls the elevator surfaces and which will now be described.

The automatic pilot includes a longitudinal attitude control gyroscope 56 provided with a gimbal ring 57, carrying two conducting sectors 58 and 59 separated by a small insulating sector 61. A contact 62, engaging either the sector 61 or one of the conducting sectors 58 and 59, is on the end of a lever 63 that is slidably supported in an arcuate slot in a supporting member 64 so that the contact 62 will be guided in an arcuate path about the sectors 58, 59 and 61. The sectors 58 and 59 are connected to two terminals of a reversible servomotor 66 while the contact 62 is connected through the lever 63 and through a direct-current source 67 to a third terminal of the motor 66. The shaft of the motor 66 is mechanically coupled through a linkage 67' to the elevator surfaces (not shown) of the airplane.

The control stick 68 of the airplane is connected at a pivot 69 to the control linkage, and through an arm 71 to a cable 72. The cable 72 is guided over a plurality of pulleys 73 and a pulley 74 and connected to the lever 63 carrying the contact 62. A spring 76 is provided to maintain the cable 72 under tension. The pulley 74 is supported at the end of a lever 77 secured to the shaft of the reversible pitch motor 52.

Neglecting temporarily the effect of operating the motor 52, the operation of the automatic pilot system when adjusted for level flight is as follows: The gyroscope 56 tends to maintain a constant attitude, with its rotor in a plane parallel to the surface of the earth. The movable contact 62 normally engages the insulating sector 61. Any deviation of the airplane from level flight will move the contact 62 with respect to the ring 57, and into contact with sector 58 and 59. Thus the motor 66 will be energized so as to run in the proper direction to adjust the elevator control surfaces to cause the airplane to resume its attitude for level flight.

When the motor 66 is operating to adjust the elevator surfaces, it also moves the cable 71, thereby rotating the contact 62 with respect to the longitudinal axis of the craft. When the contact 62 reaches the insulated sector 61, the motor 66 is deenergized. During this time the elevator surfaces have been bringing the aircraft back toward the position of level flight. As the airplane continues toward its normal attitude, the contact 62, which has been displaced ahead of the gyroscope, passes the insulated sector and engages the opposite conducting sector, causing the motor 66 to run in the reverse direction. This returns the control surfaces toward the position for a level flight. Thus, the applied control is removed as the airplane is returning to its normal attitude, so that the control surface will be back in its neutral or central position when the disturbance has been corrected. Briefly, a follow-up action has been applied to control the aircraft's attitude as a function of the gyro control.

The operation of the complete system while holding the aircraft on the desired glide path D will now be described, assuming a method of operation where the automatic pilot adjustment is the one previously described which holds the aircraft in level flight in the absence of a control action from the differential counter circuit. It is assumed that the aircraft has been flown by remote control, for example, or has been towed as a glider toward the target to an altitude and to a distance from the target such that the FM distance measuring apparatus is effective. It then automatically either increases or decreases altitude to get on the glide path and remains on this path, the control operation being as follows:

The relay armature 47 is moved to either its lower or upper position depending on whether the differential output of counters 19 and 19' is greater or less than a certain predetermined value, thus energizing the pitch motor 52 to move the pulley 74, displacing the contact 62 from the level flight position, and causing the attitude of the airplane to change in the direction for either increasing or decreasing descent.

At the same time, the pitch motor 52 also moves the follow-up tap 40 along the resistor 41, thus changing the counter bias voltage applied through resistor 38 to the counters 19 and 19' in the direction to reverse the position of the relay armature 48. The lever 77 and the follow-up tap 40 are normally centered for level flight in the method of operation being described. Assume that as the airplane moves toward the target, its rate of descent is too gradual so that its flight path is above the desired path D. Since the ratio of altitude to slant distance is too high, the relay 47, 48 is actuated to start the motor 52 and thus change the position of the pulley 74. This moves the contact 62 with respect to the gimbal ring 57, operating the motor 66 to change the flight attitude so as to bring the airplane to the path D. Motion of the pitch motor 52 also moves the follow-up tap 40, changing the counter bias voltage in the sense to increase the current in the relay coil 47 whereby as the airplane approaches the desired path D, the relay 47, 48 is operated to reverse the motor 52, returning the follow-up tap 40 and the contact 62 to their normal positions for the path D. In the example just described, mechanical control ratios between the motor 52, the pulley 74 and the follow-up tap 40 are such that the contact 62 is centered when the craft is in level flight.

It may be noted that the angle of dive $\theta$ and the terminal altitude (i. e., the altitude of the glide path over the target) may be adjusted by the taps 34' and 46, respectively. With the tap 46 at the center of resistor 42, the terminal altitude is set for zero altitude, with the tap 46 below the center position the setting is for a positive altitude, and with the tap above the center position the setting is for a negative altitude.

Instead of adjusting the system so that the automatic pilot gyroscope 56 tends to hold the aircraft in level flight in the absence of the differential counter control, it may be preferred to adjust or bias the gyroscope so that the automatic pilot itself holds the aircraft approximately on the glide path D. In this method of operation, the radio control of the altitude to slant distance ratio has greater operating range in holding the aircraft exactly on the path D; it now has only to correct for the amount that the gyroscope 56 fails to hold the aircraft on the desired glide path. The following procedure may be practiced when this method of operation is employed:

The aircraft is flown to the desired altitude and started toward the target in level flight with the gyroscope 56 adjusted for level flight. As soon as it is desired that the aircraft shall start on the glide path D, the bias of the gyroscope 56 is changed by remote control to the glide path adjustment and, at the same time, the radio differential counter control is switched in as by closing a switch 80 in the power supply circuit for the pitch motor 52.

The foregoing remarks with reference to remote control are made on the assumption that the aircraft does not carry a pilot. This would usually be the case where the aircraft is to be crashed into the target. However, the aircraft may carry a pilot in some cases as where the aircraft is to pass over the target at a predetermined low altitude or where the system is employed for a blind landing. Also, even in the case where the aircraft is to crash into the target, the aircraft may carry a pilot who makes the required adjustments at the start of the flight along the glide path and then bails out.

It will be understood that when the aircraft controls are switched over to the differential counter glide-path control, the aircraft will immediately seek the glide path D and will either climb or descend to reach this path unless it happens to be on the path D at the time.

If the aircraft is a drone that is to be crashed into the target, it may be feasible to start the drone on approximately its glide path D by the drone remote control, then lock the remote controls of the drone in position to hold the drone approximately on path D, and next switch in the differential counter control system by closing the switch 80.

If desired, means may be provided in combination with the present invention for releasing a bomb or torpedo before the aircraft reaches the target. For example, it may be desired to have the aircraft crash on the deck of an enemy ship while carrying only part of the original bomb load, the rest of the bomb or torpedo load having been released at a proper time prior to the crash to make the bomb or torpedo strike the enemy ship at or below the water line. For this purpose, the present invention may be employed in combination with a radio bomb release system such as that described and claimed in application Serial No. 524,794, filed March 2, 1944, now Patent No. 2,412,632, issued December 17, 1946, as the joint invention of Royden C. Sanders, Jr., and William R. Mercer, and entitled Radio bomb release system, or such as that described and claimed in my copending application Serial No. 524,795, filed March 2, 1944, and entitled Radio bomb release system.

In the above-mentioned Sanders and Mercer application, there is described a system for releasing bombs from an aircraft while in level flight at the proper time to hit an enemy ship or other target. The time of bomb release is determined by means of FM radar equipment which releases a bomb as a function of distance to the target and the speed of approach, assuming that the aircraft is flying at a certain predetermined altitude. An altitude compensation switch is provided which is set to the altitude adjustment corresponding to the altitude at which the bomb is to be released.

Where the aircraft is to be flown toward the target along a predetermined glide path instead of approaching the target in level flight, the aircraft may carry, in addition to the glide path control apparatus, the bomb release apparatus described in the above identified Sanders and Mercer application which has the altitude compensation adjustment set according to the requirements for glide path bombing rather than for the requirements of level flight bombing.

For glide path bombing, the altitude compensation switch is set for an altitude that is equal to the height of the deck of the enemy ship above the water line, assuming that the aircraft is to crash into the deck of the ship with part of the bomb load and is to release the remainder of the bomb load to make it strike at the water line of the ship. Stated generally, the setting of the altitude adjustment switch should be set for an altitude that is equal to the height of the aircraft (when it reaches the target) above the point where it is desired that a bomb or torpedo previously released shall strike the target.

Fig. 3 shows an automatic re-centering circuit for the gyro pilot which may be added to the system of Fig. 1 to minimize altitude errors that might result from a change in speed of the airplane, or the like. It is well known that a change in speed, a shift in load, or the like will make the airplane fly at a different attitude for level flight and hence to a different altitude when under automatic altitude control unless the elevator control surfaces or trim tabs are changed. When the pitch motor 52 is operated by the automatic control system to make the altitude correction, it moves the follow-up pointer 40 with it and if the shaft of motor 52 does not come back to its original position (and it will not come back exactly to this position if there is a change in speed or load) the follow-up pointer 40 cannot come back to its original center position as it should to fly at the correct altitude. Thus, the airplane tends to fly off the correct altitude by an amount corresponding to the amount that the follow-up pointer 40 is off its center position.

For the above reasons, it is desirable to include the circuit refinement shown in Fig. 3 where the pitch motor 52 is coupled to the pointer 40 and to a switch arm 81 through a differential unit 82. Contact points 83 and 84 are positioned on each side of the arm 81 so that contact is made after the follow-up tap 40 has moved a certain amount on either side of its center position. When contact is made, a battery 86 is connected to an averaging or slow operating motor and reduction gear unit 87 to run it in one direction or the other.

The motor 87 is coupled to the differential unit 82 so that as the motor 87 rotates it moves the follow-up tap back towards its center position. Thus the altitude error that previously resulted from the fixed angular relation of the arm 77 of the pitch motor 52 and the potentiometer arm carrying the follow-up tap 40 is substantially reduced or eliminated.

As previously indicated, the motor and reduction gear unit 87 is slow acting as compared with the pitch motor 52 so that it permits the follow-up circuit to function but, at the same time, will recenter the follow-up tap 40 after it has been off center any substantial length of time.

The above described re-centering circuit of Fig. 3 is not per se applicant's invention and is not being claimed in this application.

Fig. 4 illustrates one type of differential unit 82 that may be employed in the sytem shown in Fig. 3. Since the differential unit is conventional, its mechanical construction need not be described. It will be aparent that if the centering motor 87 is not running, the angular position of the shaft of the pitch motor 52 with respect to the shaft carrying the follow-up tap 40 will remain unchanged. Operation of the centering motor 87, however, will change the angular relation of these two shafts to re-center the tap 40 as previously described.

Fig. 5 shows a modified form of differential counter circuit which may be substituted for that shown in Fig. 1, although the circuit of Fig. 1 usually is preferred because of its improved linear frequency response. In Fig. 4, the anode 28 of the counter 19 and the cathode 27' of the counter 19' are connected directly to ground instead of to a cathode follower resistor. With these connections a relay tube 91 with grounded cathode may be employed. The operation of the elevator controls and follow-up circuit is the same as for the system of Fig. 1.

I claim as my invention:

1. A control system installed in a dirigible airborne device for guiding it to a target, said system comprising distance measuring means which includes a frequency counter for producing an electrical quantity that is a predetermined function of the distance to said target, altitude measuring means which includes a second frequency counter for producing a second electrical quantity that is a predetermined function of the altitude of said device, said two counters being connected in differential relation to obtain a differential counter output, and a control circuit responsive to said differential output for maintaining a predetermined ratio of altitude to slant distance as said air-borne device approaches the target.

2. A control system installed in a dirigible airborne device for guiding it to a target, said system comprising distance measuring means which includes a frequency counter including a storage capacitor for producing an electrical quantity that is a predetermined function of the distance to said target, altitude measuring means which includes a second frequency counter including said storage capacitor for producing a second electrical quantity that is a predetermined function of the altitude of said device, said two counters being connected in differential relation to obtain a differential output voltage at said storage capacitor, and a control circuit responsive to said differential output voltage for maintaining a predetermined ratio of altitude to slant distance as said air-borne device approaches the target.

3. The invention according to claim 2 wherein said control circuit includes means for applying a bias voltage to said counters which adds to said output voltage and includes means for changing said bias voltage in the sense to reduce the amount of contral being applied to the air-borne device by said control circuit.

4. A control system installed in a dirigible airborne device for guiding it along a predetermined glide path, said system comprising distance measuring means which includes a frequency counter for producing an electrical quantity that is a predetermined function of the distance to said target, altitude measuring means which includes a second frequency counter for producing a second electrical quantity that is a predetermined function of the altitude of said device, said two counters being connected in differential relation to obtain a differential counter output, and a control circuit responsive to said differential output for causing said air-borne device to follow said glide path.

ROYDEN C. SANDERS, JR.

REFERENCES CITED

The following references are of record in the file of this patent:

UNITED STATES PATENTS

| Number | Name | Date |
|---|---|---|
| 2,109,475 | Fanning | Mar. 1, 1938 |
| 2,161,081 | Ovtschinnikoff | June 6, 1939 |
| 2,176,469 | Moueix | Oct. 17, 1939 |
| 2,301,929 | Budenbom | Nov. 17, 1942 |
| 2,307,316 | Wolff | Jan. 5, 1943 |
| 2,315,501 | Crane et al. | Apr. 6, 1943 |

FOREIGN PATENTS

| Number | Country | Date |
|---|---|---|
| 115,055 | Australia | Apr. 23, 1942 |